(12) United States Patent
Ogawa (10) Patent No.: US 9,234,545 B2
(45) Date of Patent: Jan. 12, 2016

(54) BEARING (71) Applicant: HITACHI METALS, LTD., Tokyo (JP)

(72) Inventor: Eisuke Ogawa, Kitakyushu (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/417,627

(22) PCT Filed: Jul. 31, 2013

(86) PCT No.: PCT/JP2013/070802
§ 371 (c)(1),
(2) Date: Jan. 27, 2015

(87) PCT Pub. No.: WO2014/021399
PCT Pub. Date: Feb. 6, 2014

(65) Prior Publication Data
US 2015/0167735 A1 Jun. 18, 2015

(30) Foreign Application Priority Data

Aug. 2, 2012 (JP) ................................ 2012-171697
Aug. 28, 2012 (JP) ................................ 2012-187466

(51) Int. Cl.
*F16C 23/04* (2006.01)
*F16C 33/04* (2006.01)
*F16C 33/24* (2006.01)
(Continued)

(52) U.S. Cl.
CPC .............. *F16C 33/046* (2013.01); *C23C 2/003* (2013.01); *F16C 17/02* (2013.01); *F16C 17/12* (2013.01); *F16C 33/043* (2013.01); *F16C 33/24* (2013.01); *F16C 2210/08* (2013.01)

(58) Field of Classification Search
CPC .... F16C 17/022; F16C 33/043; F16C 33/046; F16C 2206/40; B05C 3/00–3/20; B05C 3/132

USPC .......... 384/129, 192, 247, 276, 297; 118/423, 118/428
See application file for complete search history.

(56) References Cited

U.S. PATENT DOCUMENTS 5,571,328 A * 11/1996 Newland ........................ 118/423
6,612,745 B2    9/2003 Nishizaka et al.
(Continued)

FOREIGN PATENT DOCUMENTS

JP    2001-207247 A    7/2001
JP    2001-262299 A    9/2001
(Continued)

OTHER PUBLICATIONS

International Search Report for PCT/JP2013/070802 dated Oct. 29, 2013.

*Primary Examiner* — Phillip A Johnson
(74) *Attorney, Agent, or Firm* — Sughrue Mion, PLLC (57) ABSTRACT

A bearing rotatably supporting a shaft of a rotating body immersed in a molten-metal-plating bath, comprising at least two partially cylindrical ceramic bearing members each having a sliding surface coming into sliding contact with the shaft and end surfaces directly or indirectly connected to the sliding surface; and a holding member comprising a movement-restricting member arranged with a recess, in which at least two bearing members being circumferentially arranged with their one-side end surfaces opposing via a gap, the movement-restricting member abutting the other-side end surfaces of the bearing members for restricting the circumferential movement of the bearing members; at least one bearing member being circumferentially movable to or away from the other bearing member or members in at least two bearing members, such that the one-side end surfaces opposing via the gap come into contact or are separated from each other.

5 Claims, 11 Drawing Sheets (51) Int. Cl.
*C23C 2/00* (2006.01)
*F16C 17/02* (2006.01)
*F16C 17/12* (2006.01)

(56) References Cited

U.S. PATENT DOCUMENTS 7,156,920 B2 1/2007 Plaetzer et al.
7,234,869 B1 * 6/2007 Morando .................. 384/282
2002/0181812 A1 12/2002 Nishizaka et al.
2004/0177808 A1 9/2004 Plaetzer et al.

FOREIGN PATENT DOCUMENTS

| JP | 2002-294419 A | 10/2002 |
| JP | 2004-530797 A | 10/2004 |
| JP | 2006-250274 A | 9/2006 |

* cited by examiner

BEARING

CROSS REFERENCE TO RELATED APPLICATIONS

This application is a National Stage of International Application No. PCT/JP2013/070802 filed Jul. 31, 2013 (claiming priority based on Japanese Patent Application Nos. 2012-171697, filed Aug. 2, 2012 and 2012-187466, filed Aug. 28, 2012), the contents of which are incorporated herein by reference in their entirety.

FIELD OF THE INVENTION

The present invention relates to a bearing rotatably supporting a shaft of a rotating body immersed in a molten-metal-plating bath.

BACKGROUND OF THE INVENTION

Figure 1:
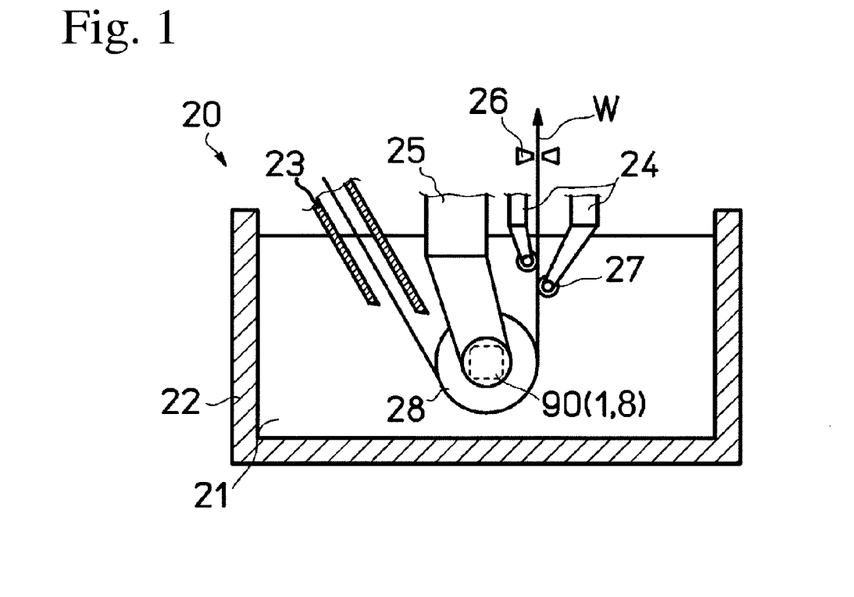
FIG. 1 is a schematic view showing a molten-metal-plating apparatus comprising the bearing of the present invention.

As shown in FIG. 1, a molten-metal-plating apparatus 20 comprises a container 22 containing a molten-metal-plating bath 21, which may be called plating bath; a snout 23 immersed in a surface portion of the plating bath 21 for preventing the oxidation of a steel sheet W introduced into the plating bath 21; a sink roll 28 arranged in the plating bath 21; a pair of support rolls 27 located above the sink roll 28 in the plating bath 21; and gas-wiping nozzles 26 located slightly above a surface of the plating bath 21. The sink roll 28 does not get an external driving force, but is driven counterclockwise by a friction force by contact with the running steel sheet W. The support rolls 27 are usually driving rolls connected to an external motor (not shown). Incidentally, the support rolls 27 may be non-driving rolls not getting an external driving force. The sink roll 28 is rotatably supported by bearings 90 mounted to the support frames 25. The support rolls 27 are also rotatably supported by bearings mounted to support frames 24. The sink roll 28 and the support rolls 27 are always immersed together in the plating bath 21.

The steel sheet W slantingly enters the plating bath 21 through the snout 23, passes through the sink roll 28, and then changes its course upward. The steel sheet W moving upward in the plating bath 21 is sandwiched by a pair of support rolls 27 pushing the steel sheet W with a constant force, to keep the pass line of the steel sheet W while preventing its curving and vibration. Gas-wiping nozzles 26 blow a high-speed gas to the steel sheet W exiting from the plating bath 21, to make the thickness of a molten metal attached to the steel sheet W uniform by the pressure of a high-speed gas. A plated steel sheet W is thus obtained.

Figure 11:
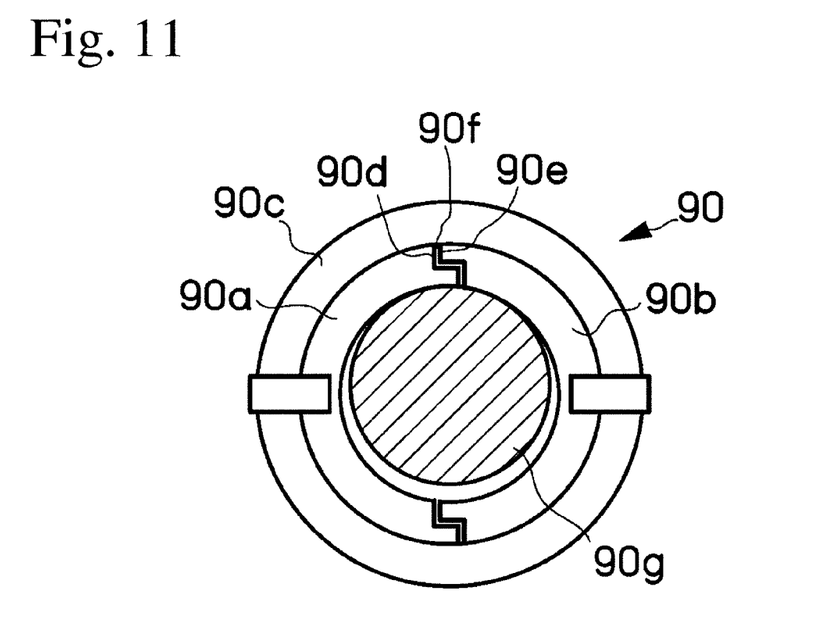
FIG. 11 is a schematic view showing a conventional bearing.

As prior art concerning a bearing assembled in a molten-metal-plating apparatus, JP 2001-207247 A discloses an immersing member coated at least partially with silicon nitride ceramics containing 2-10% by mass of chromium nitride and having a relative density of 95% or more. As shown in FIG. 11, it describes a bearing 90 comprising two semi-cylindrical ceramic bearing members 90a, 90b disposed in a cylindrical metal-made holding member 90c. Because of thermal expansion difference between the ceramic bearing members 90a, 90b and a plating bath (molten metal), the bearing 90 lifted from the plating bath is subject to compression or tensile stress due to the cooling of a plating bath between an outer peripheral surface of the bearing 90 and an inner peripheral surface of the holding member 90c. JP 2001-207247 A describes that stress can be relieved by gaps 90f of 1 mm or more between circumferentially opposing end surfaces 90d, 90e of the bearing members 90a and 90b in the bearing 90.

However, the bearing of JP 2001-207247 A suffers wear and breakage by direct contact between the shaft 90g and the bearing members 90a, 90b, though the breakage of the bearing members 90a, 90b is prevented by the gaps 90f between two bearing members 90a, 90b as described above. Namely, when the gaps 90f between two bearing members 90a, 90b are located such that they are brought into contact with an outer peripheral surface of the rotating shaft 90g, kinetic pressure for supporting the shaft 90g is low at the gaps 90f, resulting in direct contact between the shaft 90g and the sliding surfaces and/or edges of end surfaces 90d, 90e of the bearing members 90a, 90b. As a result, the shaft 90g and the bearing members 90a, 90b are prematurely worn, resulting in shorter lives. Further, in the case of a sink roll driven by a friction force by contact with the running steel sheet without being rotated by a motor, etc., the direct contact of the shaft 90g with the sliding surfaces leads to an increased friction coefficient, so that the rotation of the sink roll cannot follow the running speed of a steel sheet. As a result, slipping occurs between the steel sheet and the outer peripheral surface of the sink roll, likely generating defects such as scratches on the steel sheet.

JP 2001-262299 A discloses a sliding bearing apparatus for a roll used in a continuous molten-metal-plating bath, which comprises a bearing of hard sintered ceramics coming into sliding contact with a shaft of the roll, and a steel-made holder movably holding the bearing. It is described that the bearing is partially cylindrical, with an effective angle of more than 90° and 160° or less. JP 2001-262299 A describes that using a bearing apparatus comprising a holder movably holding a bearing, it is possible to prevent the breakage of the bearing due to the solidification shrinkage of a residual plating metal while the bearing apparatus lifted from the plating bath is cooled.

However, even if the bearing apparatus of JP 2001-262299 A is used, the ceramic bearing may be broken by repeated use. Particularly when the center angle (θ in FIG. 1 in JP 2001-262299 A) of the bearing is relatively large (about 100° or more), the ceramic bearing is highly likely broken.

JP 2002-294419 A discloses a bearing for a roll used in a continuous molten-metal-plating bath, which comprises a metal-made bearing holder, a partially cylindrical ceramic member received in a groove extending in the entire shaft length in an inner peripheral surface of the bearing holder, and a gap provided between an inner wall of the groove of the bearing holder and an outer surface of the ceramic member for discharging a molten metal. It is described that when the bearing is lifted from the bath, a molten metal entering a gap between the bearing holder and the ceramic member can be easily discharged, thereby preventing the compression breakage of the bearing.

However, even if the bearing of JP 2002-294419 A is used, the ceramic member may be broken by repeated use. Particularly when the center angle (θ1 in FIG. 1 of JP 2002-294419 A) of the ceramic bearing is relatively large (about 100° or more), the ceramic bearing is highly likely broken.

JP 2004-530797 A discloses an apparatus for coating a metal ribbon with a molten metal, which comprises a shaft rotatably supported in a molten metal for guiding the metal ribbon, two sliding ceramic bearing shells each having a bearing surface for supporting the shaft, and a deformable element formed by a graphite sheet, etc. between two bearing shells. It is described that because two bearing shells can be deformed while keeping connection, by the deformable element having flexibility, the bearing shells are not broken even if a large radial force is applied between two bearing shells.

However, because two bearing shells are connected via the deformable element in JP 2004-530797 A, a molten metal entering a gap between the bearing shells and a bearing housing containing the bearing shells is not quickly discharged, so that the bearing shells are likely broken due to thermal expansion difference between the bearing shells and the bearing housing and/or the solidification of the molten metal, when the coating apparatus is lifted. Also, because the bearing shells described in JP 2004-530797 A have two flat bearing surfaces (sliding surfaces), stress is concentrated, likely causing breakage.

JP 2006-250274 A discloses a roll bearing used in a continuous molten-metal-plating bath, which comprises a ceramic bearing having an inner peripheral surface for supporting the roll shaft, a metal-made bearing holder for holding an outer peripheral surface of the ceramic bearing, and a buffer disposed between the outer peripheral surface of the ceramic bearing and the inner peripheral surface of the metal-made bearing holder, the buffer being formed by weaving at least yarns with long alumina fibers like a carpet. With the ceramic bearing divided to an upper ceramic bearing part and a lower ceramic bearing part, buffers are disposed between an outer peripheral surface of the upper ceramic bearing part and an inner peripheral surface of the metal-made bearing holder, and between the upper ceramic bearing part and the lower ceramic bearing part. JP 2006-250274 A describes that because the buffers have improved non-wettability to the molten metal, the solidified molten metal can be easily removed, and the molten metal does not enter the buffers, resulting in high heat insulation by air in the buffers.

However, because a gap between the divided ceramic bearing is filled with the buffer in the roll bearing described in JP 2006-250274 A, a molten metal entering a gap between the ceramic bearing and the metal-made bearing holder is not quickly discharged, so that the ceramic bearing is likely broken due to thermal expansion difference between the ceramic bearing and the metal-made bearing holder and/or the solidification of the molten metal, when the coating apparatus is lifted.

OBJECT OF THE INVENTION

Accordingly, an object of the present invention is to provide a bearing rotatably supporting a shaft of a rotating body immersed in a molten-metal-plating bath, which comprises ceramic-based bearing members assembled in a holding member, to prevent the bearing members from being broken by a plating bath in a gap between the holding member and the bearing members, when the bearing is lifted, and to prevent direct contact between the shaft and the bearing members during operation.

DISCLOSURE OF THE INVENTION

As a result of intensive research in view of the above object, the inventor has found that in a bearing comprising partially cylindrical ceramic bearing members and a holding member receiving the bearing members, when the bearing members are circumferentially arranged with their end surfaces opposing via a gap to enable their circumferential movement, a molten metal entering a gap between the bearing members and the holding member is quickly discharged when the bearing is lifted, thereby preventing the ceramic bearing members from being broken by thermal expansion difference between the bearing members and the holding member and/or the solidification of the molten metal, and preventing decrease in kinetic pressure between the bearing members and the shaft during operation. The present invention has been completed based on such finding.

Thus, the bearing of the present invention rotatably supporting a shaft of a rotating body immersed in a molten-metal-plating bath comprises at least two partially cylindrical ceramic bearing members each having a sliding surface coming into sliding contact with the shaft and end surfaces directly or indirectly connected to the sliding surface; and a holding member comprising a movement-restricting member arranged with a recess, in which at least two bearing members being circumferentially arranged with their one-side end surfaces opposing via a gap, the movement-restricting member abutting the other-side end surfaces of the bearing members for restricting the circumferential movement of the bearing members;

at least one bearing member being circumferentially movable to or away from the other bearing member or members in at least two bearing members, such that the one-side end surfaces opposing via the gap come into contact or are separated from each other.

The gap preferably crosses a centerline of the sliding surfaces when the centerline is viewed through the gap.

The movement-restricting member preferably has circumferentially projecting curved end surfaces abutting the other-side end surfaces of the bearing members.

The other-side end surfaces of the bearing members, or the end surfaces of the movement-restricting member opposing the other-side end surfaces of the bearing members are preferably provided with radially extending grooves.

The movement-restricting member preferably has circumferentially extending grooves communicating with the recess.

DESCRIPTION OF THE PREFERRED EMBODIMENTS

The bearing of the present invention will be explained referring to the drawings below, without intention of restricting the present invention thereto. As long as the effects of the present invention are obtained, modifications may be properly made within the scope of the present invention. As a rotating body immersed in a plating bath, a bearing rotatably supporting a shaft of a sink roll will be explained below. It should be noted that the present invention is similarly applicable to support rolls and other rotating bodies immersed in molten-metal-plating baths. Detailed explanations of such molten-metal-plating apparatus as shown in FIG. 1, in which the bearing of the present invention may be assembled, are omitted.

[1] First Embodiment

Figure 2:
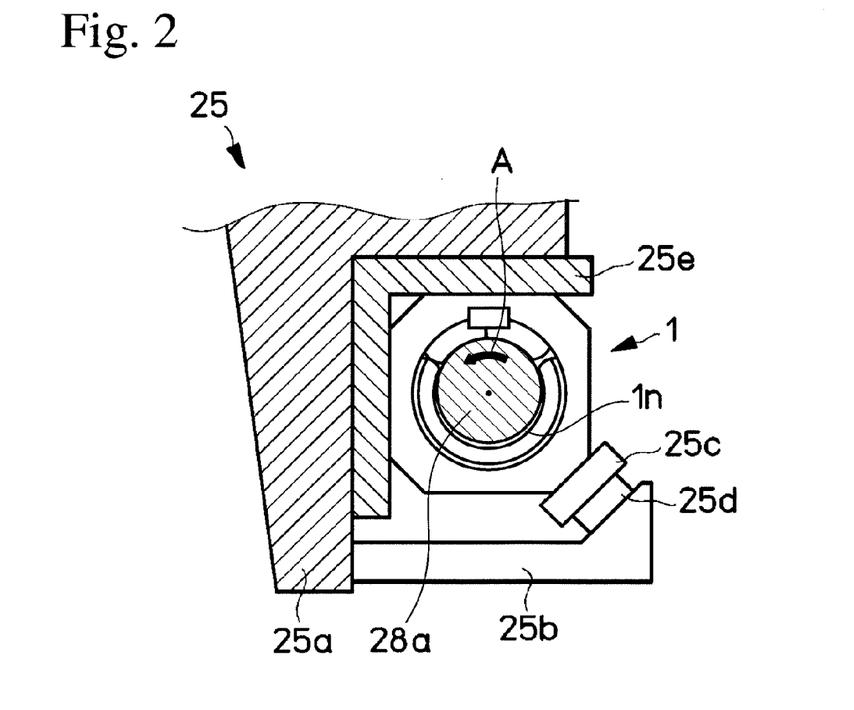
FIG. 2 is a partial cross-sectional view showing the bearing of the present invention and its surroundings.

As shown in FIG. 2, the bearing 1 is attached to an inner surface of substantially L-shaped support member 25e having two perpendicular sides, which is mounted to a tip end portion 25a of a substantially rectangular fixing frame 25 immersed in a plating bath 21 of a molten-metal-plating apparatus 20, such that the upper and left surfaces of the bearing 1 are fixed to the inner surfaces of the support member 25e. An arm 25b extending rightward from the tip end portion 25a of the fixing frame 25 is provided on its right end with a fixing flat plate member 25c via a pressing member 25d comprising a resilient member, etc. The fixing member 25c abuts a lower right portion of the bearing 1 to press the bearing 1 to the support member 25e, such that the bearing 1 is closely attached to the support member 25e. A shaft 28a of a sink roll 28 penetrates a hole 1n of the bearing 1 fixed to the support member 25e. The tension of a steel sheet W in contact with an outer peripheral surface of the sink roll 28, buoyancy by the plating bath, etc. are applied to the sink roll 28 in operation, so that the sink roll 28 is subject to upward pressure. Accordingly, the shaft 28a of the sink roll 28 is rotated, with its outer peripheral surface supported by sliding inner surfaces 1c, 1d of the hole 1n.

Figure 3A:
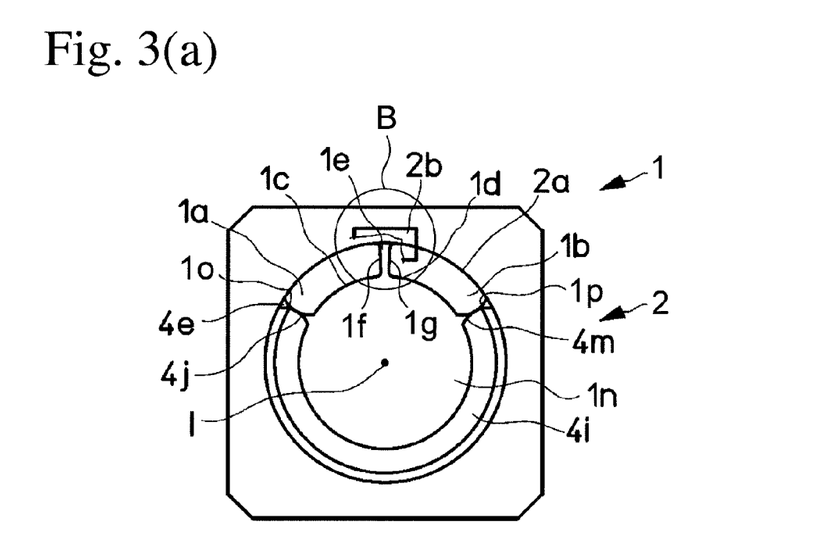
FIG. 3(a) is a schematic view showing a bearing according to the first embodiment of the present invention.

As shown in FIG. 3(a), the bearing 1 for rotatably supporting the shaft 28a of the rotating body immersed in the molten-metal-plating bath 21 comprises at least two partially cylindrical ceramic-based bearing members 1a, 1b each having a surface 1c, 1d in sliding contact with the shaft 28a, one end surface 1f, 1g directly connected to the sliding surface 1c, 1d, and the other end surface 1o, 1p on the opposite side; a recess 4e for receiving at least two bearing members 1a, 1b in a circumferential arrangement around the center axis I, such that the end surfaces 1f, 1g are opposing via a gap 1e; and a holding member 2 comprising a movement-restricting member 4i for restricting the circumferential movement of the bearing members 1a, 1b. At least two bearing members 1a, 1b are assembled in the holding member 2, such that the bearing members 1a, 1b having end surfaces 1f, 1g opposing via the gap 1e are circumferentially movable to each other. Though two bearing members are depicted in FIG. 3(a), this is not restrictive, but three or more bearing members may be arranged. The bearing members 1a, 1b, the holding member 2 and the movement-restricting member 4i will be explained in detail below.

(1) Bearing Means

As shown in FIG. 3(a), each bearing member 1a, 1b has a partially cylindrical shape having an arcuate cross section perpendicular to the shaft, with a sliding surface 1c, 1d having the same radius from the center axis I. The bearing members 1a, 1b are circumferentially arranged in the recess 4e, with the end surfaces 1f, 1g opposing via the gap 1e, and the other end surfaces 1o, 1p abutting end surfaces 4j, 4m of the movement-restricting member 4i. Thus, a substantially cylindrical hole 1n of the bearing 1, into which the shaft 28a is inserted, is defined by the sliding surfaces 1c, 1d of the bearing members 1a, 1b received in the recess 4e, and the movement-restricting member 4i arranged in the holding member 2.

Figure 3B:
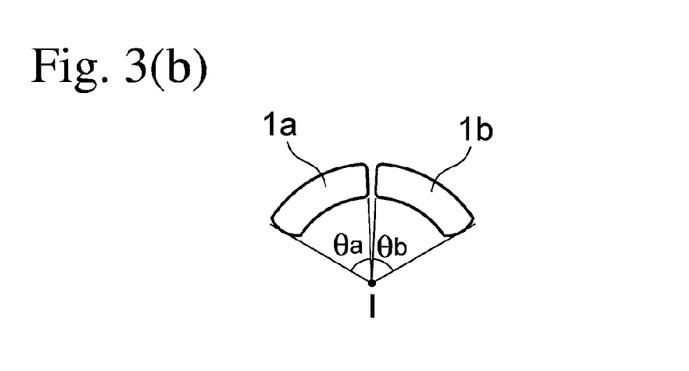
FIG. 3(b) is a schematic view showing bearing members in FIG. 3(a).

The center angle θa, θb of each bearing member 1a, 1b in a cross section perpendicular to the shaft [see FIG. 3(b)] is preferably 90° or less, more preferably 30-85°, most preferably 50-70°. The sliding surface 1c, 1d of each bearing has a larger radius of curvature than that of the shaft 28a. Though not restrictive, the width of the gap 1e may be properly determined depending on the radii of the shaft 28a and the sliding surfaces 1c, 1d. For example, the radius of curvature of the sliding surface 1c, 1d of each bearing is preferably 20-100 mm, more preferably 30-90 mm. In this case, the width of the gap 1e is preferably 5 mm or less, more preferably 0.1-5 mm, most preferably 0.5-5 mm. The axial length of each bearing member 1a, 1b is preferably 300 mm or less, more preferably 30-200 mm, most preferably 50-200 mm. The radial thickness of each bearing member 1a, 1b is preferably 5-40 mm, more preferably 10-30 mm.

Figure 3C:
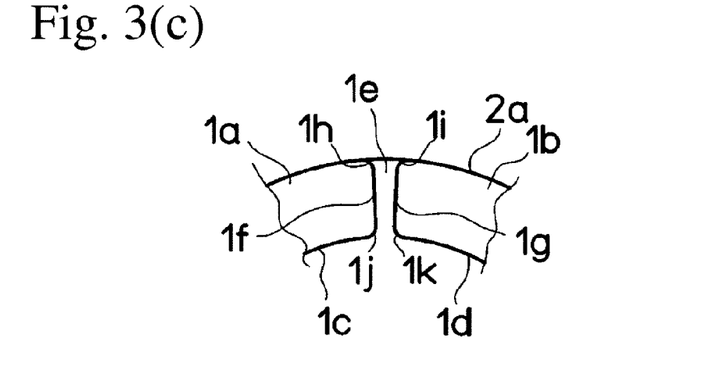
FIG. 3(c) is an enlarged view showing a portion B in FIG. 3(a).

In the bearing members 1a, 1b, the opposing end surfaces 1f and 1g may be connected to the sliding surfaces 1c and 1d directly or indirectly via round surfaces 1j, 1k, etc. as shown in FIG. 3(c).

The bearing members 1a, 1b are arranged in the holding member 2 circumferentially movably to each other. In this example, the bearing member 1a is fixed to the holding member 2, and the bearing member 1b is circumferentially movable, but oppositely the bearing member 1b may be fixed to the holding member 2, and the bearing member 1a may be circumferentially movable. When there are three or more bearing members, at least one bearing member is fixed, and other bearing members may be movable.

The movement of the bearing members 1a, 1b in a direction of the center axis I is restricted by positioning pieces 2b fixed to side surfaces of the holding member 2. Each positioning piece 2b is arranged such that it is in slight contact with a side surface of one bearing member (for example, bearing member 1b) to avoid the restriction of the circumferential movement of the bearing member 1b. Such structure enables the bearing member 1b to move circumferentially by a circumferential force. The restriction of the axial movement of the bearing members 1a, 1b can be achieved not only by the positioning pieces 2b, but also by any proper means not restricting the circumferential movement of the bearing member 1b.

To ensure the easy discharge of a plating bath from the bearing 1 being lifted, as shown in FIG. 3(c), each bearing member 1a, 1b preferably has a round surface 1j, 1k in a corner portion in which the end surface 1f, 1g and the sliding inner surface 1c, 1d are connected. From the same aspect, each bearing member 1a, 1b also preferably has a round surface 1h, 1i in a corner portion in which the end surface 1f, 1g and its outer peripheral surface are connected. The round surfaces 1j, 1k and 1h, 1i may be chamfered surfaces. The radius of curvature of each round surface 1j, 1k may be a half or less of the radial thickness of each bearing member 1a, 1b, for example, about 2.5-20 mm. The length of the chamfered surface may be a half or less of the radial thickness of each bearing member 1a, 1b, for example, about 2.5-20 mm.

Ceramics for the bearing members 1a, 1b may be inorganic materials such as alumina, zirconia, silica and other oxide ceramics; zirconium boride, titanium boride and other boride ceramics; silicon carbide, boron carbide and other carbide ceramics; or carbon, depending on heat shock resistance, corrosion resistance, etc. required for an atmosphere and other operation conditions in which the bearing members 1a, 1b are used. Because of rapid heating and cooling by immersion in and removal from the plating bath, the bearing members 1a, 1b are preferably made of materials having excellent heat shock resistance. Accordingly, ceramics for the bearing members 1a, 1b are preferably silicon nitride, aluminum nitride and other nitride ceramics having high thermal conductivity, particularly silicon nitride ceramics including sialon having high erosion resistance and wear resistance to a molten metal in the plating bath as well as excellent high-temperature strength.

(2) Holding Member

Figure 4:
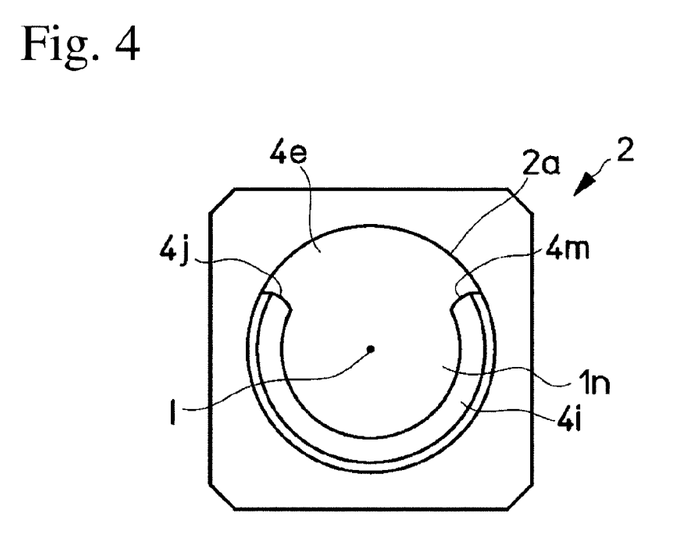
FIG. 4 is a schematic view showing a holding member in the bearing of the present invention.

As shown in FIG. 4, the holding member 2 having a substantially rectangular cross section perpendicular to the center axis I comprises a hole 2a, and a partially cylindrical (having a substantially semicircular cross section) movement-restricting member 4i arranged on an inner peripheral surface of the hole 2a. A space not occupied with the movement-restricting member 4i is a recess 4e defined by the inner peripheral surface of the hole 2a and the circumferential end surfaces 4j and 4m of the movement-restricting member 4i for receiving the bearing members 1a, 1b. The movement-restricting member 4i may be integral with the holding member 2, or a separate movement-restricting member 4i may be mechanically fixed to the inner peripheral surface of the hole 2a.

The diameter of the hole 2a is substantially the same as the outer diameter of each bearing member 1a, 1b. Though not restrictive, the holding member 2 is preferably formed by an easily-machinable-metal-based material. In such a case, the metal is preferably coated with, for example, ceramics, cermet, etc. from the aspect of corrosion resistance to the plating bath.

(3) Movement-Restricting Member

Figure 5A:
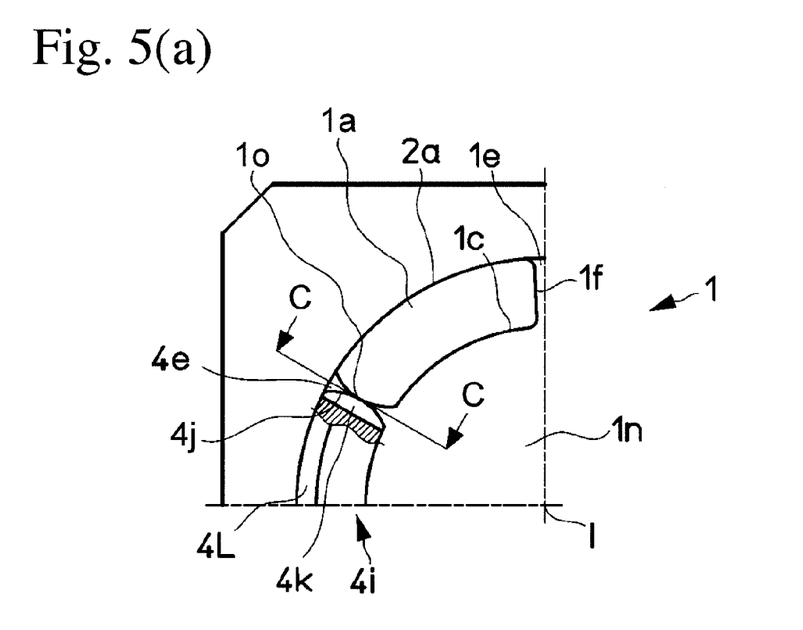
FIG. 5(a) is an enlarged, partial cross-sectional view showing an upper left quarter of the bearing of FIG. 3(a).

As shown in FIG. 4, the end surfaces 4j, 4m of the movement-restricting member 4i are preferably circumferentially projecting curved surfaces. As shown in FIG. 5(a), the other-side end surfaces 1o, 1p of the bearing members 1a, 1b opposing the end surfaces 4j, 4m of the movement-restricting member 4i are also preferably circumferentially outward-projecting curved surfaces. All of the end surfaces 4j, 4m of the movement-restricting member 4i and the other-side end surfaces 1o, 1p of the bearing members 1a, 1b opposing the end surfaces 4j, 4m of the movement-restricting member 4i need not be curved surfaces, but at least any one surface may be a curved surface, and at least one of opposing surfaces is preferably a curved surface. The end surfaces 4j, 4m of the movement-restricting member 4i and/or the other-side end surfaces 1o, 1p of the bearing members 1a, 1b may be provided with ridges. For example, when each sliding surface 1c, 1d of the bearing has a radius of curvature of 20-100 mm, the ridges may have a width of about 5-10 mm, a pitch of about 10-20 mm, and a height of about 1-10 mm. The pitch is a period of ridges.

With any one of the end surfaces 4j, 4m of the movement-restricting member 4i and the other-side end surfaces 1o, 1p of the bearing members 1a, 1b being a curved surface, a plating bath entering a gap between the inner peripheral surface of the holding member 2 and the outer peripheral surfaces of the bearing members 1a, 1b can be easily discharged through a gap defined by the curved end surface.

Figure 5B:
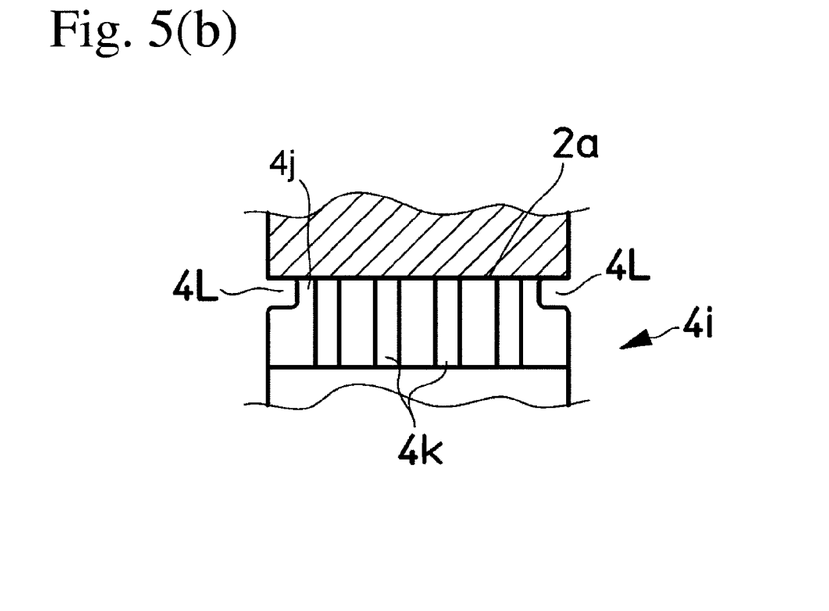
FIG. 5(b) is a cross-sectional view taken along the line C-C in FIG. 5(a).
Figure 5C:
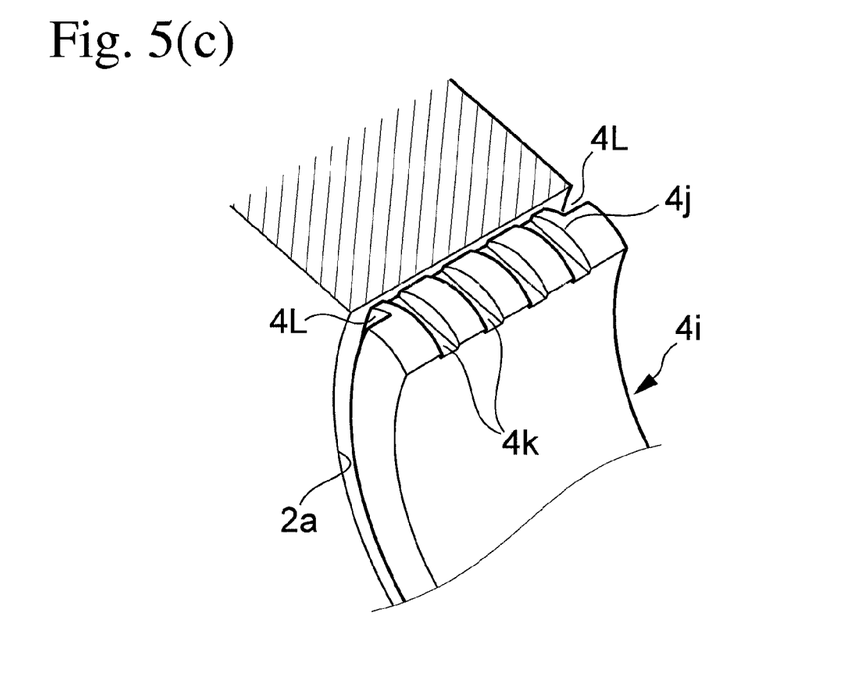
FIG. 5(c) is a perspective view showing a C-C cross section in FIG. 5(a).

As shown in FIGS. 5(a), 5(b) and 5(c), the end surfaces 4j, 4m of the movement-restricting member 4i preferably have radially extending grooves 4k. For example, when each sliding surface 1c, 1d of the bearing has a radius of curvature of 20-100 mm, the grooves 4k may have an axial width of about 5-10 mm in a shaft direction. Each radially extending groove 4k on each end surface 4j, 4m of the movement-restricting member 4i is circumferentially open in the recess 4e and communicating with the hole 1n. In the example shown in FIGS. 5(b) and 5(c), each end surface 4j, 4m of the movement-restricting member 4i has four radial grooves 4k, though the number of radial grooves 4k may be one, or two or more. The grooves 4k may be formed on the other-side end surfaces 1o, 1p of the bearing members 1a, 1b in place of the end surfaces 4j, 4m of the movement-restricting member 4i. The grooves 4k need only be formed on at least one of the movement-restricting member 4i and the bearing members 1a, 1b.

With the grooves 4k formed on the end surfaces 4j, 4m of the movement-restricting member 4i, a plating bath entering a gap between the inner peripheral surface of the holding member 2 and the outer peripheral surfaces of the bearing members 1a, 1b can be easily discharged through the grooves 4k. Though a cross section shape of each groove 4k is not particularly restricted, but when grooves 4k each having a substantially rectangular cross section are formed on the other-side end surfaces 1o, 1p of the ceramic-made bearing members 1a, 1b, each groove 4k preferably has a round corner surface between the bottom surface and the side surface, to prevent the breakage of the grooves 4k by rapid heating or cooling when the bearing is immersed in or removed from a high-temperature plating bath. The grooves 4k may also have a substantially semicircular cross section without an acute corner.

The movement-restricting member 4i preferably has circumferentially extending grooves 4L communicating with the recess 4e. For example, when each sliding surface 1c, 1d of the bearing has a radius of curvature of 20-100 mm, each groove 4L may be radially about 5-10 mm and axially about 5-10 mm. As shown in FIGS. 5(a), 5(b) and 5(c), each groove 4L formed on a side surface of the movement-restricting member 4i constituting the holding member 2 is substantially semicircular, and communicating with the recess 4e. Each groove 4L has a circumferential end open to the recess 4e, to achieve communication with the recess 4e. A cross section shape of each groove 4L is not particularly restricted. The grooves 4L make it easy to discharge a plating bath in a gap between the inner peripheral surface of the holding member 2 and the outer peripheral surfaces of the bearing members 1a, 1b.

(4) Operation

The operation of the bearing of the present invention 1, in which at least one of the bearing members 1a, 1b is circumferentially movable, will be explained below. As shown in FIG. 2, with the shaft 28a of the sink roll 28 inserted into the hole 1n of the bearing 1, the bearing 1 is fixed to the support member 25e mounted to tip end portion 25a of the fixing frame 25, and immersed in the plating bath 21. The sink roll 28 is subject to an upward lifting force by the tension of a steel sheet W generated by immersion in the plating bath 21, buoyancy by the plating bath, etc., so that the shaft 28a comes into contact with the bearing members 1a, 1b. In this state, there is a gap 1e between the end surfaces 1g, 1f of the bearing members 1a, 1b as shown in FIG. 6(a).

After a steel sheet W to be plated is wound around an outer peripheral surface of the sink roll 28 immersed in the plating bath 21, the steel sheet W is moved in an arrow direction in FIG. 1. In this case, the shaft 28a is rotated counterclockwise in a direction A in FIG. 6(b). When an outer peripheral surface of the shaft 28a rotating in the arrow direction A (counterclockwise) comes into sliding contact with the sliding surfaces 1c, 1d, as shown in FIG. 6(c), the bearing member 1b moves in the arrow direction A (counterclockwise) by sliding friction. Because the other-side end surface 1o of the bearing member 1a on the left side of the bearing member 1b abuts the movement-restricting member 4i, the movement of the bearing member 1a is restricted. As a result, only the bearing member 1b on the right side circumferentially moves toward the bearing member 1a. By this movement of the bearing member 1b, the end surface 1g of the bearing member 1b comes into contact with the end surface 1f of the bearing member 1a, closing the gap 1e therebetween. As a result, the sliding surfaces 1c, 1d become substantially circumferentially continuous, apparently acting as a single sliding surface. Accordingly, kinetic pressure drop on the sliding surface due to the gap 1e can be avoided, suppressing direct contact between the shaft 28a and the bearing members 1a, 1b. To further suppress kinetic pressure drop, the end surfaces 1f, 1g are preferably, for example, complementarily flat surfaces, such that they are in close contact with each other.

When the shaft 28a is rotated in a direction opposite to the arrow A (clockwise), the bearing member 1b is fixed, and the bearing member 1a is circumferentially movable. As a result, the shaft 28a rotating in a direction opposite to the arrow A (clockwise) moves the bearing member 1a in a direction opposite to the arrow A (clockwise), so that the end surfaces 1f, 1g of the bearing members 1a, 1b come into contact with each other.

Figure 6A:
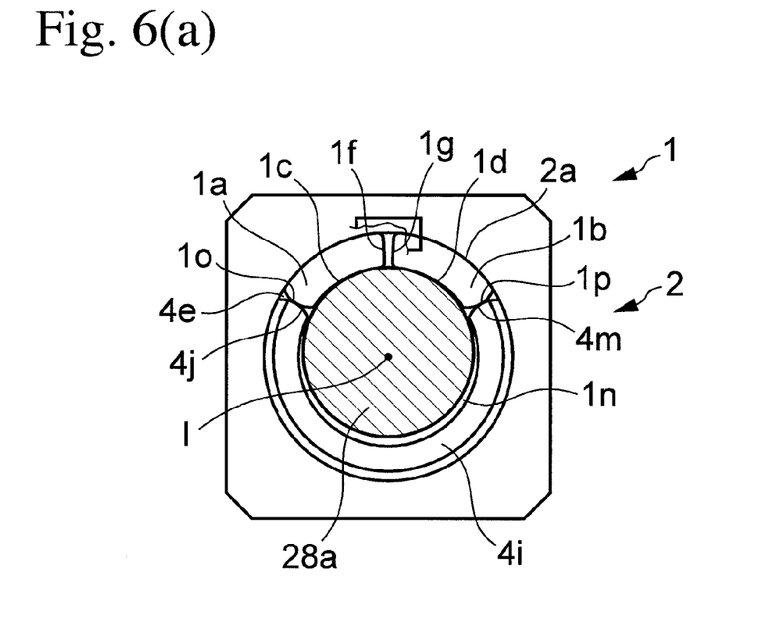
FIG. 6(a) is a partial cross-sectional view showing the bearing according to the first embodiment of the present invention in an operating state.
Figure 6B:
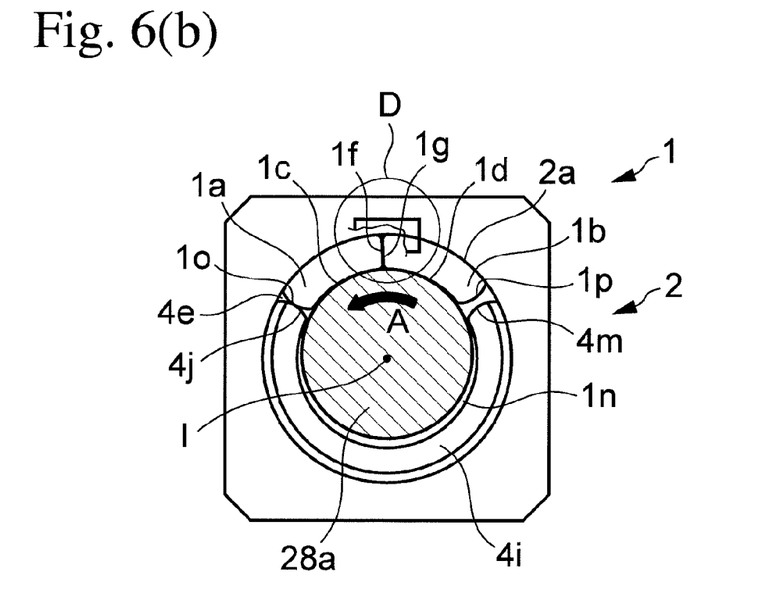
FIG. 6(b) is a partial cross-sectional view showing the bearing according to the first embodiment of the present invention in an operating state.
Figure 6C:
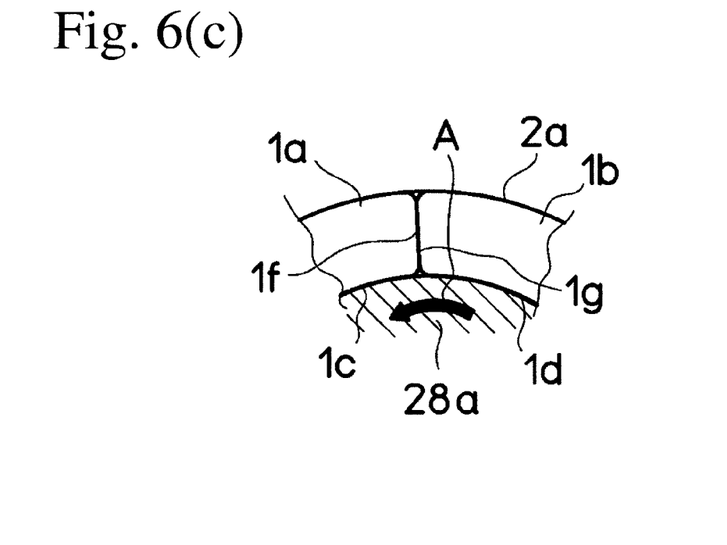
FIG. 6(c) is an enlarged view showing a portion D in FIG. 6(b).

When the sink roll 28 is lifted from the plating bath 21 after operation, the circumferentially movable bearing member 1b moves downward by gravity, returning to the assembled state shown in FIG. 6(a). As a result, a gap 1e is generated between the end surfaces 1f, 1g of the bearing members 1a, 1b, so that a plating bath entering a gap between the inner peripheral surface of the holding member 2 and the outer peripheral surfaces of the bearing members 1a, 1b is discharged through the gap 1e, preventing the breakage of the bearing members 1a, 1b due to the solidification of the plating bath in the lifted bearing 1.

[2] Second Embodiment

Figure 7A:
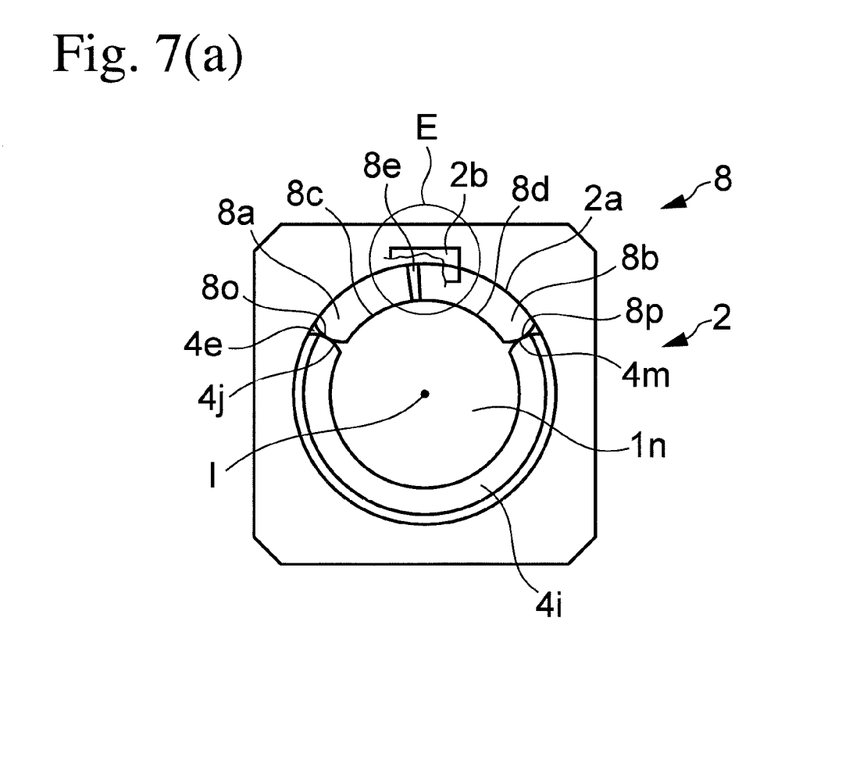
FIG. 7(a) is a schematic view showing a bearing according to the second embodiment of the present invention.
Figure 7B:
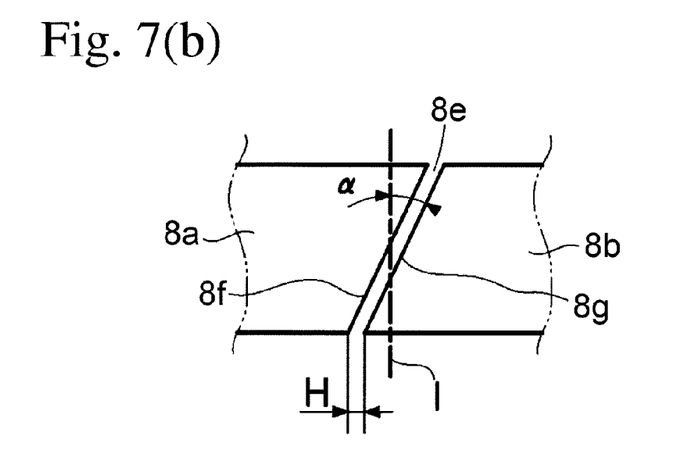
FIG. 7(b) is a schematic plan view showing bearing members in a portion E in FIG. 7(a).

As shown in FIGS. 7(a) and 7(b), a bearing 8 in the second embodiment of the present invention is the same as the bearing 1 in the first embodiment, except for having two bearing members 8a, 8b having one-side end surfaces 8f, 8g opposing via a gap 8e, which looks overlapping the center axis I of the sliding surfaces 8c, 8d when the center axis I is viewed through the gap 8e. Namely, two bearing members 8a, 8b have opposing one-side end surfaces 8f, 8g not in parallel with the center axis I of its sliding surfaces 8c, 8d.

The bearing 8 in the second embodiment will be explained in detail below. Because other members than the bearing members 8a, 8b are the same as those in the bearing 1 in the first embodiment, their explanation will be omitted.

(1) Bearing Members

The bearing members 8a, 8b have flat, parallel end surfaces 8f, 8g opposing with a circumferential width H and crossing the center axis I at an angle α. Accordingly, when the center axis I is viewed through the gap 8e, the gap 8e crosses the center axis I at an angle α. Though not restrictive, the angle α is preferably 5-45°, more preferably 10-30°, to exhibit the effects of the present invention. Each sliding surface 8c, 8d of the bearing has a larger radius of curvature than that of the shaft 28a. The width H of the gap 8e is not particularly restricted, but may be properly determined depending on the radii of the shaft 28a and the sliding surfaces 8c, 8d. For example, each sliding surface 8c, 8d of the bearing has a radius of curvature of preferably 20-100 mm, more preferably 30-90 mm. In this case, the width H of the gap 8e is preferably 5 mm or less, more preferably 0.1-5 mm, most preferably 0.5-5 mm. The axial length of the bearing members 8a, 8b is preferably 300 mm or less, more preferably 30-200 mm, most preferably 50-200 mm. The radial thickness of the bearing members 8a, 8b is preferably 5-40 mm, more preferably 10-30 mm.

The center angle θa, θb of each bearing member 8a, 8b in a cross section perpendicular to the shaft is preferably 90° or less, more preferably 30-85°, most preferably 50-70°. The cross section perpendicular to the shaft is a cross section at an axial center of each bearing member 8a, 8b. Each sliding surface 8c, 8d of the bearing has a larger radius of curvature than that of the shaft 28a, as in the first embodiment.

Figure 7C:
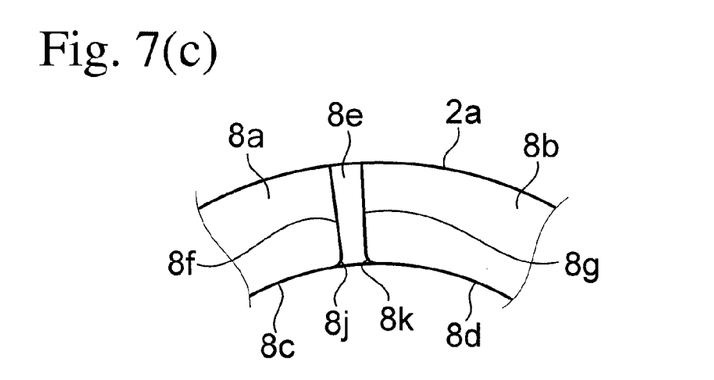
FIG. 7(c) is an enlarged view showing a portion E in FIG. 7(a).
Figure 7D:
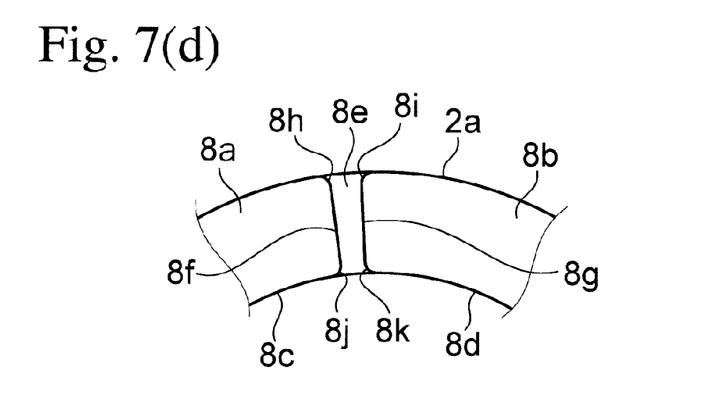
FIG. 7(d) is a schematic view showing another example of opposing end surfaces of the bearing members.

To prevent the breakage and wear of corners connecting sliding surfaces 8c, 8d and end surfaces 8f, 8g in the bearing members 8a, 8b, as shown in FIG. 7(c), the corners are desirably provided with round surfaces 8j, 8k as in the first embodiment. From the same aspect, corners connecting end surfaces 1f, 1g and peripheral surfaces in the bearing members 1a, 1b are also preferably provided with round surfaces 8h, 8i, as shown in FIG. 7(d). They may have chamfered surfaces in place of the round surfaces 8j, 8k and 8h, 8i. The radius of curvature of each round surface 8j, 8k may be a half or less of the radial thickness of each bearing member 8a, 8b, for example, about 2.5-20 mm, and the length of each chamfered surface may be a half or less of the radial thickness of each bearing member 8a, 8b, for example, about 2.5-20 mm.

Though both end surfaces 8f, 8g of the bearing members 8a, 8b are arranged in parallel to cross the center axis I at an angle α in the above example, the bearing according to second embodiment of the present invention is not restricted thereto, but may have any structure, as long as the gap crosses the center axis I when the center axis I is viewed through the gap between the bearing members as described below. When each end surface 8f, 8g crosses the center axis I at an angle α as in this embodiment, namely when the bearing members 8a, 8b have end portions (called non-overlapping portions) in which their sliding regions do not overlap the gap 8e in a direction of the center axis I, the shaft 28a is stably supported.

Figure 8A:
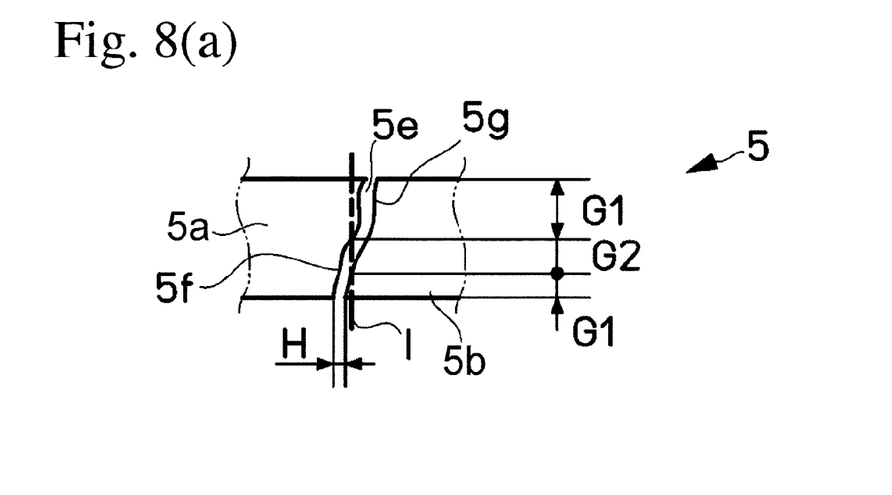
FIG. 8(a) is a schematic view of another example of opposing end surfaces of the bearing members, which are viewed from the same point as in FIG. 7(b).

As shown in FIG. 8(a), the bearing members 5a, 5b may have opposing curved end surfaces 5f, 5g constituting a gap 5e with an uneven width H along the center axis I. In this bearing 5, the bearing members 5a, 5b are arranged such that the gap 5e crosses the center axis I when the center axis I is viewed through the gap 5e, thereby forming non-overlapping portions G1 for keeping kinetic pressure.

Figure 8B:
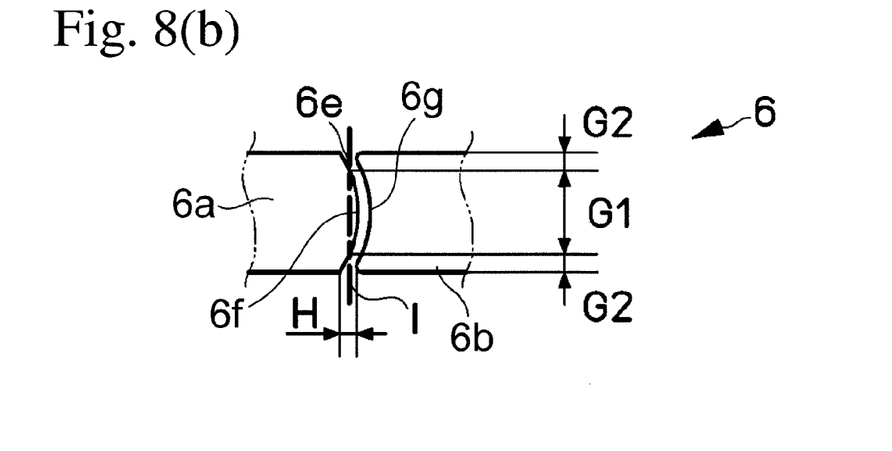
FIG. 8(b) is a schematic view of a further example of opposing end surfaces of the bearing members, which are viewed from the same point as in FIG. 7(b).

A bearing 6 shown in FIG. 8(b) comprises bearing members 6a, 6b having opposing end surfaces 6f, 6g, which are a combination of a convex surface and a concave surface to form a curved gap 6e. In this bearing 6, the bearing members 6a, 6b are arranged such that the gap 6e crosses the center axis I when the center axis I is viewed through the gap 6e, thereby forming a non-overlapping portion G1 in a center portion in a direction of the center axis I of the bearing members 6a, 6b.

Figure 8C:
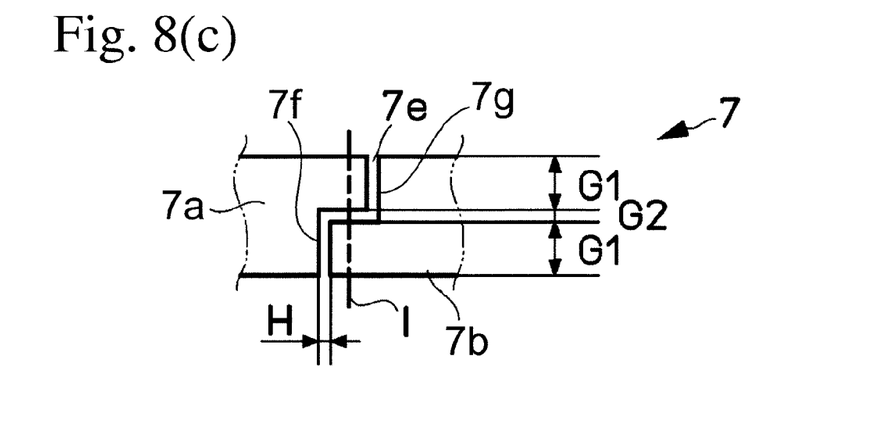
FIG. 8(c) is a schematic view of a still further example of opposing end surfaces of the bearing members, which are viewed from the same point as in FIG. 7(b).

A bearing 7 shown in FIG. 8(c) comprises bearing members 7a, 7b having opposing stepwise end surfaces 7f, 7g, which form a crooked gap 7e crossing the center axis I. In this bearing 7, non-overlapping portions G1 are formed on both end portions of the bearing members 7a,7b.

(2) Operation

Figure 9A:
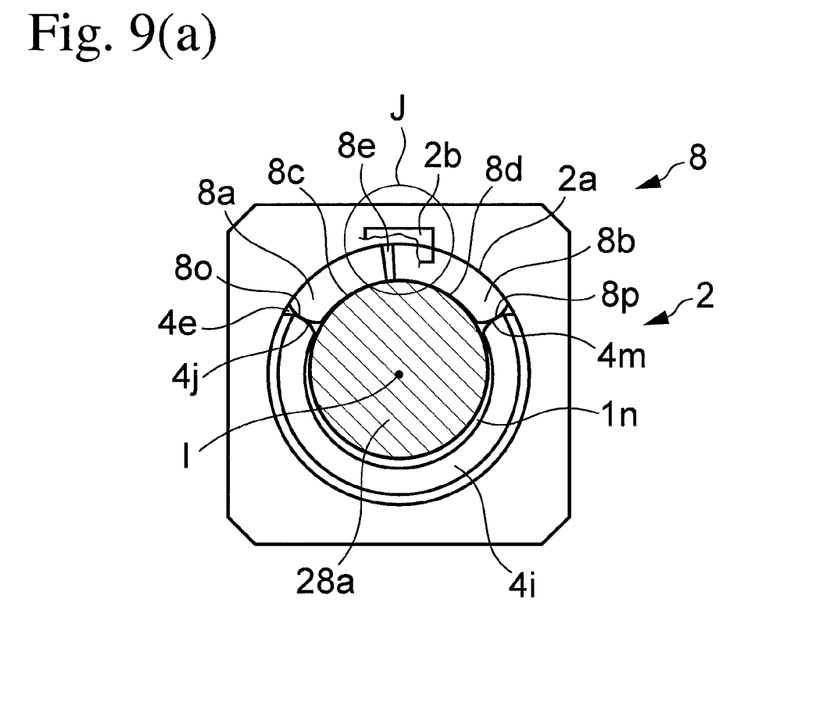
FIG. 9(a) is a partial cross-sectional view showing a bearing according to the second embodiment of the present invention in an operating state.
Figure 10A:
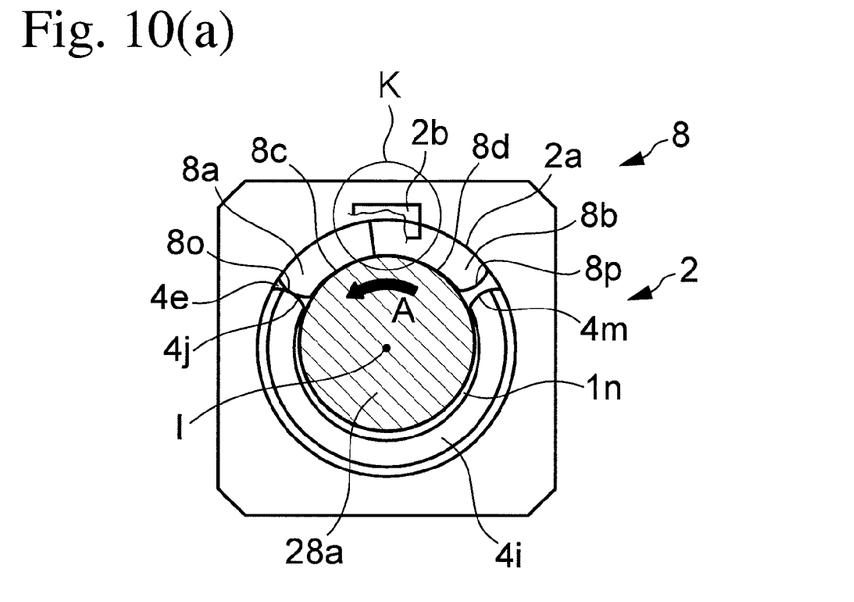
FIG. 10(a) is a partial cross-sectional view showing a bearing according to the second embodiment of the present invention in an operating state.

When the bearing 8 in the second embodiment having the bearing members 8a, 8b thus constituted is used, an outer peripheral surface of the shaft 28a rotating counterclockwise as shown in FIG. 9(a) comes into sliding contact with the sliding surfaces 8c, 8d, so that the bearing member 8b moves by sliding friction in a direction shown by the arrow A (counterclockwise) as shown in FIG. 10(a), as in the bearing 1 in the first embodiment.

Figure 9B:
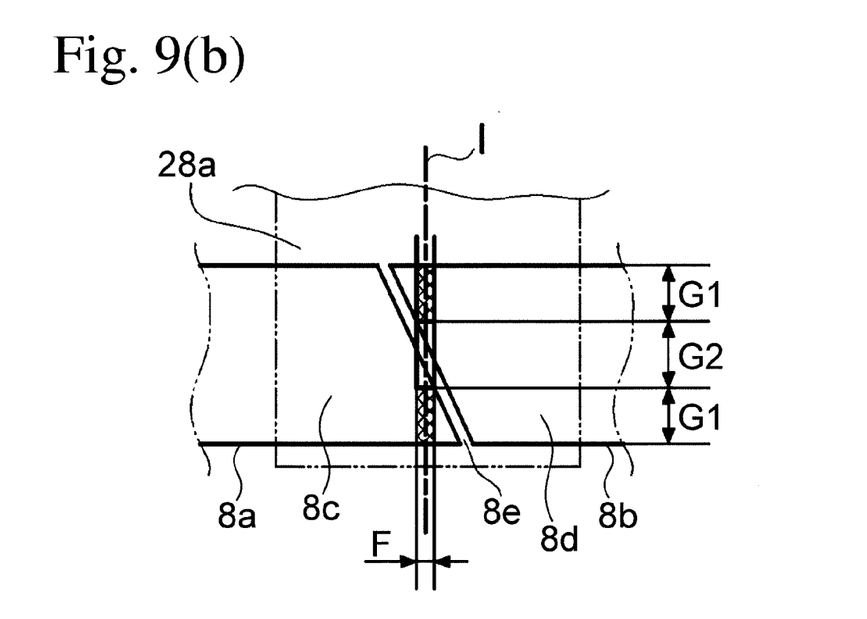
FIG. 9(b) is a schematic view of a portion J in FIG. 9(a), which is viewed through the center axis.

At an early stage of the rotation of the shaft 28a, there is a gap 8e between the one-side end surfaces 8f, 8g of the bearing members 8a, 8b as shown in FIG. 9(a). The rotating shaft 28a is in sliding contact with the sliding surfaces 8c, 8d of the bearing members 8a, 8b as shown in FIG. 9(b), resulting in a region (called sliding region) F sliding on the outer peripheral surface of the shaft 28a and crossing the gap 8e. As the rotation speed of the shaft 28a increases, more kinetic pressure is generated in the sliding region F.

As shown in FIG. 9(b), a portion G2 of the sliding region F overlapping the gap 8e in a direction along the center axis I, which may be called overlapping portion, has low kinetic pressure because of the gap 8e, but kinetic pressure generated between the sliding surfaces 8c, 8d and the outer peripheral surface of the shaft 28a is kept in a portion G1 of the sliding region F not overlapping the gap 8e, which may be called non-overlapping portion. Thus, the non-overlapping portion G1 saves the bearing 8 in the second embodiment from kinetic pressure drop due to the gap 8e at an early stage of rotation, resulting in preventing direct contact between the shaft 28a and the bearing members 8a, 8b. Namely, a slanting gap 8e is better in preventing direct contact between the shaft 28a and the bearing members 8a, 8b even in a short period of time until an open gap 8e is closed, than an axially parallel gap 8e. Also, a slanting gap 8e makes corners of the end surfaces 8f, 8g and the sliding surfaces 8c, 8d resistant to breakage and wear under sliding friction with the shaft 28a.

Figure 10B:
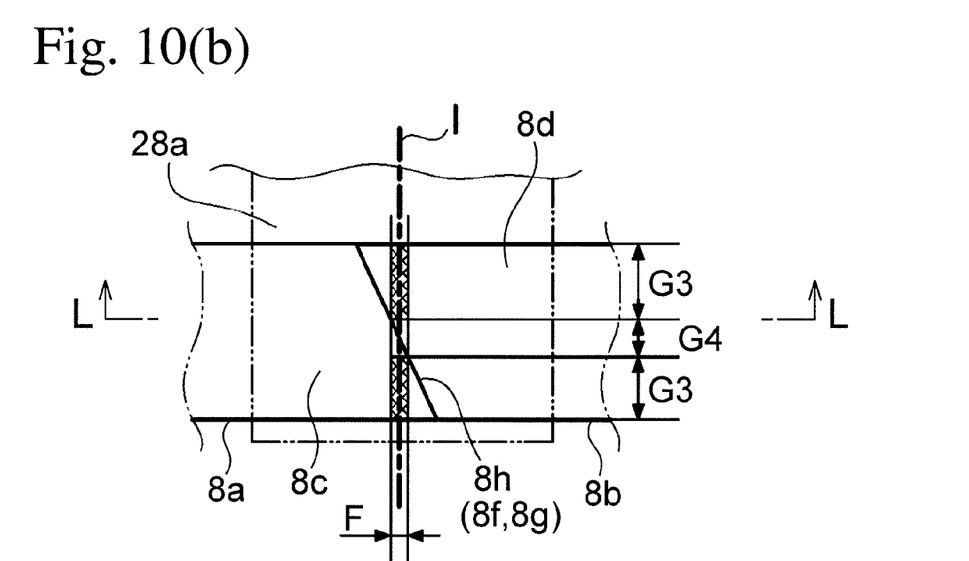
FIG. 10(b) is a schematic view of a portion K in FIG. 10(a), which is viewed through the center axis.

Further, as shown in FIGS. 10(a) and 10(b), the rotation of the shaft 28a applies a force in a direction shown by the arrow A to the bearing members 8a, 8b by sliding contact, moving the bearing member 8b on the right side in a direction shown by the arrow A until its end surface 8g abuts the end surface 8f of the bearing member 8a, thereby closing the gap 8e therebetween, so that the sliding surfaces 8c, 8d look circumferentially continuous as if a single sliding surface, as in the bearing 1 in the first embodiment. As a result, kinetic pressure decreased by the gap 8e in the overlapping portion G2 of the sliding region F and the gap 8e is recovered, preventing direct contact between the shaft 28a and the bearing members 8a, 8b. To further suppress decrease in kinetic pressure, the end surfaces 8f, 8g are desirably complementarily flat surfaces so that they come into close contact with each other.

In the bearing 8 in the second embodiment, the bearing member 8b moves circumferentially toward the bearing member 8a until they come into contact with each other as described above, resulting in an contact interface 8h crossing the center axis I in a plan view as shown in FIG. 10(b). The contact interface 8h also has portions G3 not overlapping the sliding region F, which may be called non-overlapping portions, and a portion G4 overlapping the sliding region F, which may be called overlapping portion.

Like the gap 8e of the bearing 8, the shape of the contact interface 8h in a plan view is not particularly restricted, as long as the contact interface 8h crosses the center axis I when projected. Particularly, with the contact interface 8h having the sliding region F having the overlapping portion G4 sandwiched by the non-overlapping portions G3 as in this embodiment, the shaft 28a is more stably supported.

EFFECTS OF THE INVENTION

Because a molten metal entering a gap between the bearing members and the holding member is quickly discharged when the bearing of the present invention is lifted from a plating bath, the breakage of ceramic bearings due to thermal expansion difference between the bearing members and the holding member and/or the solidification of the molten metal is effectively prevented. Also, because kinetic pressure between the bearing members and the shaft does not decrease during operation, the bearing members are free from breakage and wear.

What is claimed is:

1. A bearing rotatably supporting a shaft of a rotating body immersed in a molten-metal-plating bath, comprising
at least two partially cylindrical ceramic bearing members each having a sliding surface coming into sliding contact with said shaft and end surfaces directly or indirectly connected to said sliding surface; and
a holding member comprising a movement-restricting member arranged with a recess, in which the at least two bearing members being circumferentially arranged with their one-side end surfaces opposing via a gap, said movement-restricting member abutting the other-side end surfaces of the bearing members for restricting the circumferential movement of the bearing members;
at least one bearing member being circumferentially movable to or away from the at least one other bearing member in the at least two bearing members, such that the one-side end surfaces opposing via said gap come into contact or are separated from each other.

2. The bearing according to claim 1, wherein said gap crosses a centerline of said sliding surfaces when said centerline is viewed through said gap.

3. The bearing according to claim 1, wherein said movement-restricting member has circumferentially projecting curved end surfaces abutting the other-side end surfaces of said bearing members.

4. The bearing according to claim 3, wherein the other-side end surfaces of said bearing members, or the end surfaces of said movement-restricting member opposing the other-side end surfaces of said bearing members are provided with radially extending grooves.

5. The bearing according to claim 3, wherein said movement-restricting member has circumferentially extending grooves communicating with said recess.

* * * * *